United States Patent [19]

Ogawa

[11] 4,363,500
[45] Dec. 14, 1982

[54] AUTOMATIC SEAT BELT DEVICE

[75] Inventor: Hisashi Ogawa, Okazaki, Japan

[73] Assignee: Toyota Jidosha Kogyo Kabushiki Kaisha, Aichi, Japan

[21] Appl. No.: 197,016

[22] Filed: Oct. 15, 1980

[30] Foreign Application Priority Data

Jul. 18, 1980 [JP] Japan .................. 55-101527[U]

[51] Int. Cl.³ .............................................. B60R 21/10
[52] U.S. Cl. .................................. 280/802; 297/469; 280/804
[58] Field of Search .............. 280/802, 803, 804, 808; 297/469

[56] References Cited

U.S. PATENT DOCUMENTS 4,253,681 3/1981 Barnett ............................... 280/808
4,256,330 3/1981 Geoffrey .............................. 280/802

Primary Examiner—Robert R. Song
Attorney, Agent, or Firm—Stevens, Davis, Miller & Mosher

[57] ABSTRACT

An automatic seat belt device installed in each seat of a motor vehicle and applied automatically to an occupant of the seat upon closing of an automotive door and adapted to confine the occupant to a back rest of a front seat in a vehicle. This seat belt device is comprised of an outer belt connected in V shape to upper and lower anchors of the door, and an inner belt connected through a ring joint to the outer belt. At the outer belt weaving between the ring joint on the outer belt and the lower anchor attached to the lower portion of the door is mounted a stopper adapted to prevent the ring joint from sliding down along the outer belt. Thus, the device can introduce the seat belt to a relatively high position where it does not interfere with the occupant's riding space in the vehicle when the door is opened.

2 Claims, 5 Drawing Figures

AUTOMATIC SEAT BELT DEVICE

BACKGROUND OF THE INVENTION

This invention relates to an automatic seat belt device and, more particularly, to improvements of an automatic seat belt device essentially installed in each seat of a motor vehicle and applied automatically to an occupant of the seat upon closing of a door, so-called a "passive seat belt device".

The conventional automatic seat belt device, as shown by dotted broken lines in FIG. 1, engages an outer belt B and an inner belt C through a ring joint D. When a door 1 is opened, the ring joint D slides down along the outer belt B. Thus, the engaging position of the outer belt B with the inner belt C through the ring joint D is moved toward a seat cushion E, so that an interval h between the engaging position and the upper surface of the seat cushion may become narrow. This causes an occupant's riding space to become very narrow, and may cause inconvenience to the occupant riding in a vehicle. In order to eliminate this disadvantage, proposals have been made to provide a guide member, for guiding the base F of the inner belt C upwardly and forwardly and attached to a retractor side, or an anchor mounted under the door with long boots for retaining the lower end portion of the outer belt B at a higher position. The former has, however, a complicated mechanism which introduces an expensive cost and lacks reliability as a seat belt, while the latter creates a large space between the occupant and the lower portion of the outer belt to thus deteriorate its performance in confining the occupant.

SUMMARY OF THE INVENTION

Accordingly, a primary object of this invention is to provide an automatic seat belt device which eliminates the aforementioned disadvantages and drawbacks of the conventional automatic seat belt device and can introduce the seat belt to a relatively high position where it does not disturb the occupant's riding in a vehicle when a door is opened.

Another object of this invention is to provide an automatic seat belt device which can form sufficient space for the occupant to ride in a vehicle.

Still another object of this invention is to provide an automatic seat belt device which has a simple construction and may be formed inexpensively and imparts no adverse effect to the performance of confining the occupant in the vehicle.

These and other objects and advantages of the invention may be readily ascertained by referring to the following description and appended drawings in which:

DESCRIPTION OF THE PREFERRED EMBODIMENTS

It is to be noted that the automatic seat belt device according to this invention can be mounted in any seat of a motor vehicle. For simplicity's sake, the invention will be described herein with reference to some embodiments of the invention which are incorporated in the seat of the driver of the motor vehicle and embodiments incorporated in a front seat. It should be understood, however, that this description is for illustrative purposes only and that the invention is not limited to the particular seat of the motor vehicle in which the device is described as being mounted.

Figure 1:
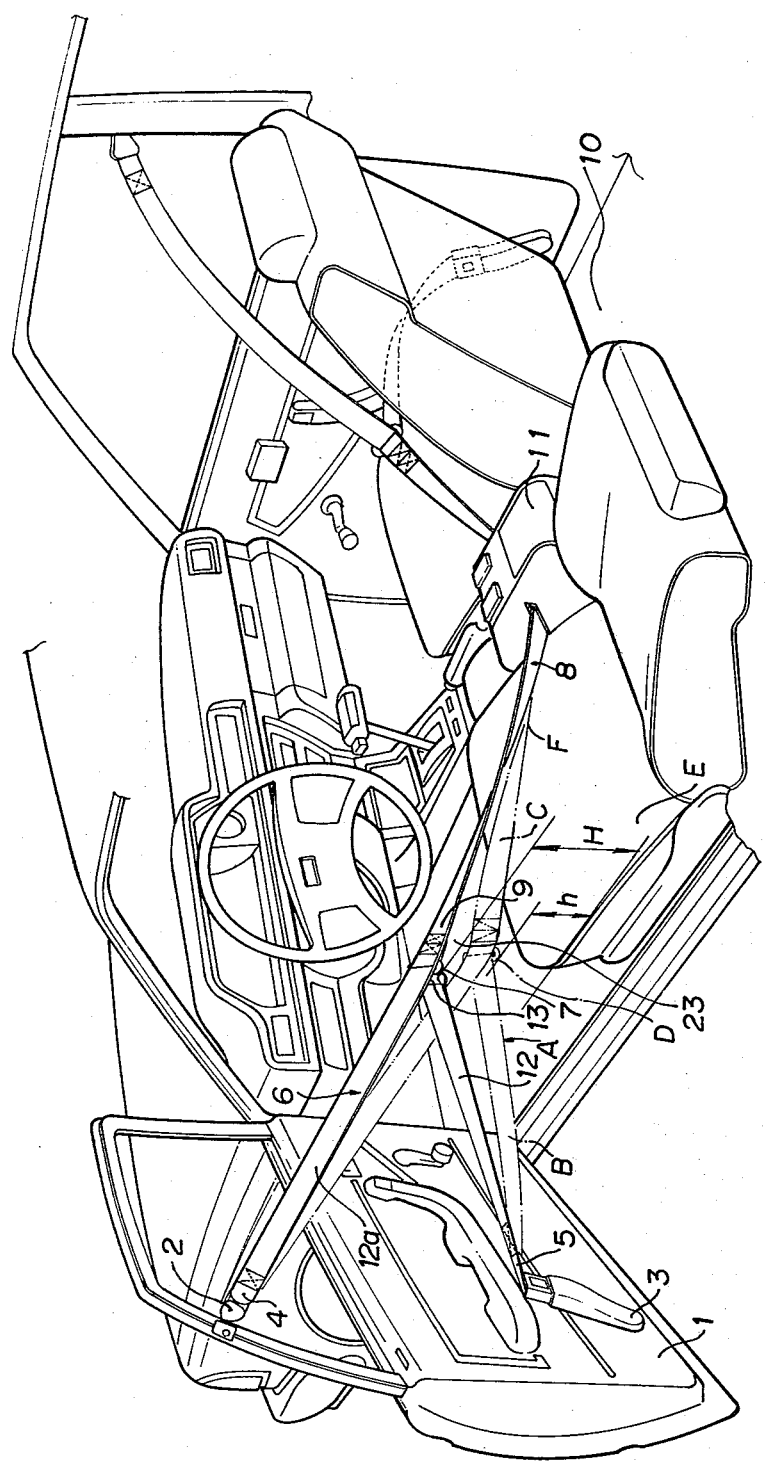
FIG. 1 is a perspective view of one preferred embodiment of an automatic seat belt device embodying this invention as mounted on a seat of an occupant compartment in a vehicle.

Referring now to the drawings, particularly to FIG. 1 showing a first embodiment of the automatic seat belt device of this invention, wherein like reference numerals designate the same parts in the following views, the automatic seat belt device comprises an outer belt 6 connected at upper and lower ends 4 and 5 to an upper anchor 2 and a lower anchor 3, respectively of a door 1, and an inner belt 8 connected at one end 9 through a ring joint 7 to the outer belt 6 as bent in V shape and adapted to confine an occupant to a back rest of a front seat. The said inner belt 8 is wound at the other end to a retractor, which is omitted in the drawing but disposed within a center console 11 provided at the center of a floor 10.

At an outer belt weaving 12 between the ring joint 7 at the outer belt 6 and the lower anchor 3 attached to the lower portion of the door 1 is mounted a stopper 13 for preventing the ring joint 7 from sliding down along the outer belt 6.

It is to be understood that in this invention the position for mounting the stopper 13 is located in such a range that the ring joint 7 may confine an occupant at his front abdominal portion when the seat belt of the three end type is mounted on the occupant and that the ring joint 7 is retained sufficiently at an upper portion as designated by H in FIG. 1 when the door 1 is opened as will be described in greater detail.

Figure 2:
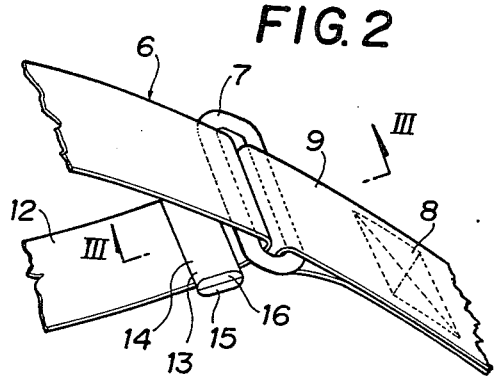
FIG. 2 is a perspective view of the essential part of the automatic seat belt device embodying one example of this invention.
Figure 3:
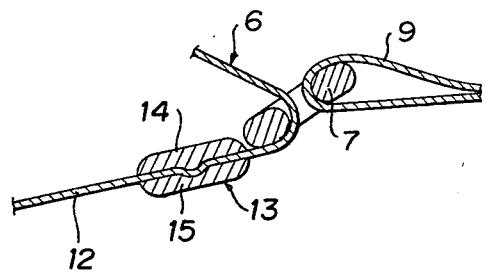
FIG. 3 is a sectional view of the automatic seat belt device taken along the line III—III in FIG. 2.

The stopper shown in FIG. 1 is composed, as illustrated in FIGS. 2 and 3, of upper and lower pieces 14 and 15 disposed at upper and lower side surfaces of the outer belt weaving 12 along the outer belt weaving 12 for gripping the outer belt weaving 12 therebetween. These pieces 14 and 15 may be engaged, adhered or clamped with screws at both side ends 16 thereof. It will be seen that in this invention the stopper 13 is at pieces 14 and 15 elevationally swelled upward and downward from the surface of the outer belt weaving 12 thereby preventing the ring joint 7 from sliding down along the outer belt 6.

Figure 4:
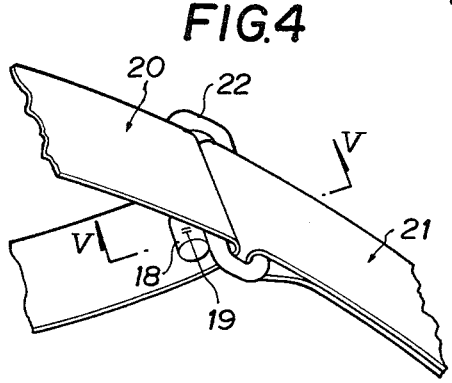
FIG. 4 is a perspective view of the essential part of another preferred embodiment of the automatic seat belt device of this invention.
Figure 5:
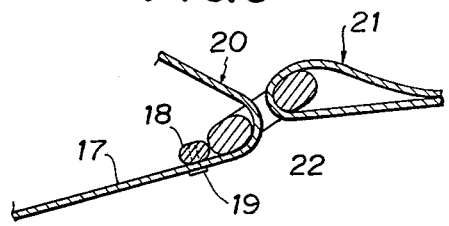
FIG. 5 is a sectional view of the automatic seat belt device taken along the line V—V in FIG. 4.

The second example of the stopper will be described with reference to FIGS. 4 and 5. A stopper 18 is contacted with the inside surface of the outer belt weaving 17, and sewed fixedly via a sewing yarn 19 to the outer belt weaving 17. The stopper 18 serves to prevent the ring joint 22 for connecting the outer belt 20 to the inner belt 21 from sliding down along the outer belt weaving 17 in the same manner as the stopper 13 shown in FIGS. 2 and 3.

Operation of these embodiments constructed as aforementioned will now be described. When door 1 is opened, the upper and lower ends 4 and 5 of the outer belt 6 connected to the door 1 through the upper and lower anchors 2 and 3, respectively will move with the door 1. Thus, the inner belt 8 is accordingly pulled out from the retractor (not shown). The outer belt 6 moves outwardly with the door 1 from the seat cushion E. In this case the ring joint 7 tends to normally slide downwardly along the outer belt weaving 12 from the outer belt weavings 12, 12a bent in V shape along the outer belt 6 to the position where the system is balaced with the tension acting on the inner belt 8. Since the stopper 13 is, however, provided, the ring joint 7 is prevented from sliding down and retained at a relatively high position to be moved outwardly with the door 1.

Consequently, wide interval H is formed between the end 9 of the inner belt 8 and the upper surface of the seat cushion E, and allows an occupant to sufficiently ride in a vehicle through a riding space 23 formed at the upper forward space of the seat cushion E.

Accordingly, there is formed sufficient riding space 23 as was described at the position of the stopper 13 or 18. It is to be understood that the stopper 13 or 18 may be located necessarily at such a position as to allow the ring joint 7 or 22 to slide down to introduce the inner belt 8 or 21 to their optimum position in the automatic seat belt device of three end type.

From the foregoing description, it will be appreciated that this embodiment of the automatic seat belt device according to this invention can be incorporated in a seat of a motor vehicle which is disposed adjacent a door and permits seat belt means to be automatically applied to the body of an occupant of the seat in association with opening and closing of the door by the extremely simple construction of the provision of a stopper for preventing the ring joint from sliding down at the outer belt weaving, so that, when the door is opened, the seat belt composed of an outer belt and an inner belt is introduced to a relatively high position so as not to disturb the riding of the occupant in the vehicle and wide riding space is formed.

It should also be understood that since the automatic seat belt device according to this invention accommodates a simple construction of a stopper mounted at the outer belt weaving, the device may be inexpensively fabricated, and since no alteration is applied to the construction of the anchors and the retractor, this device does not adversely affect the performance of confining the occupant to the seat belt and accordingly retain high reliability for the seat belt.

What is claimed is:

1. An automatic seat belt device comprising:
   an upper anchor and a lower anchor secured to the upper and lower portions of an automotive door;
   an outer belt connected at upper and lower ends thereof to said upper and lower anchors, respectively;
   an inner belt connected at one end thereof through a ring joint to said outer belt and at the other end thereof to a retractor provided at the center of an automotive floor to extend from the retractor;
   an outer belt weaving provided between the ring joint on said outer belt and said lower anchor attached to the lower portion of the door; and
   a stopper secured to said outer belt weaving for preventing the ring joint from sliding down along said outer belt and located in such a range that the ring joint confines an occupant at his front abdominal portion when the seat belt of the three end type is mounted on the occupant and that the ring joint is retained sufficiently at the upper portion of said outer belt, wherein said stopper comprises an upper piece and a lower piece disposed at the upper and lower side surfaces of said outer belt weaving along said outer belt weaving for gripping said outer belt weaving therebetween, said upper and lower pieces secured at both side ends thereof to each other, and said stopper is elevationally swelled at said pieces upward and downward from the surface of said outer belt weaving thereby preventing the ring joint from sliding down along said outer belt.

2. An automatic seat belt device as defined in claim 1, wherein the upper piece and the lower piece of said stopper respectively have a recess and a corresponding projection at the center of the inner surfaces thereof whereby said weaving is fastened between said upper piece and said lower piece of said stopper by an ordinary force applied to said stopper by applying a force stronger than a prescribed force to said weaving, thereby adjusting the mounting position of said stopper.

* * * * *